(12) United States Patent
Peeters et al.

(10) Patent No.: US 9,371,881 B2
(45) Date of Patent: *Jun. 21, 2016

(54) END MEMBER, GAS SPRING ASSEMBLY AND METHOD

(71) Applicant: Firestone Industrial Products Company, LLC, Indianapolis, IN (US)

(72) Inventors: Leonardus J. B. Peeters, Wageningen (NL); Machiel G. A. Wentink, Velp (NL); Daniel I. Levy, Essex (GB); Daniel P. Steele, Brownsburg, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/518,572

(22) Filed: Oct. 20, 2014

(65) Prior Publication Data

US 2015/0035212 A1 Feb. 5, 2015

Related U.S. Application Data

(63) Continuation of application No. 13/500,448, filed as application No. PCT/US2009/060635 on Oct. 14, 2009, now Pat. No. 8,864,113.

(51) Int. Cl.
*F16F 9/04* (2006.01)
*F16F 9/32* (2006.01)
*B60G 11/27* (2006.01)
(Continued)

(52) U.S. Cl.
CPC .............. *F16F 9/3242* (2013.01); *B60G 11/27* (2013.01); *B60G 11/28* (2013.01); *F16F 9/0454* (2013.01); *F16F 9/05* (2013.01);
(Continued)

(58) Field of Classification Search
CPC ......... F16F 9/04; F16F 9/0409; F16F 9/0418; F16F 9/0427; F16F 9/0436; F16F 9/0445; F16F 9/0454; F16F 9/0463; F16F 9/05; F16F 9/052; F16F 9/057; B60G 11/28; B60G 2202/152; B60G 2204/126
See application file for complete search history.

(56) References Cited

U.S. PATENT DOCUMENTS 6,527,259 B1 3/2003 Németh et al.
6,942,201 B2 9/2005 Leonard
(Continued)

FOREIGN PATENT DOCUMENTS

DE 4230249 9/1992
DE 295 10 199 U1 * 10/1995 ............. B60G 11/27
(Continued)

OTHER PUBLICATIONS

English-language abstract of EP 2385269 (no date).*
(Continued)

*Primary Examiner* — Nicholas J Lane
(74) *Attorney, Agent, or Firm* — Thomas R. Kingsbury; Fay Sharpe LLP

(57) ABSTRACT

An end member for a gas spring assembly includes an end member wall with a first wall portion at least partially defining a substantially-flat surface area in a first plane, a second wall portion at least partially defining an outer peripheral extent of the end member wall and a third wall portion at least partially defining a substantially-flat surface area in a second plane. A valley can extend lengthwise along the third wall portion. A gas spring assembly and method of assembly are also included.

20 Claims, 10 Drawing Sheets

(51) Int. Cl.
*B60G 11/28* (2006.01)
*F16F 9/05* (2006.01)

(52) U.S. Cl.
CPC .... *B60G 2202/152* (2013.01); *B60G 2204/126* (2013.01); *F16F 2226/04* (2013.01); *Y02E 50/17* (2013.01)

(56) References Cited

U.S. PATENT DOCUMENTS

| | | |
|---|---|---|
| 8,333,367 B2 | 12/2012 | Schuckel |
| 2007/0089951 A1 | 4/2007 | Skiba |
| 2008/0143027 A1 | 6/2008 | Knevels |
| 2011/0187035 A1 | 8/2011 | Cagle |

FOREIGN PATENT DOCUMENTS

| | | |
|---|---|---|
| EP | 2385269 A2 * | 11/2011 |
| WO | WO-2008/017459 | 2/2008 |
| WO | WO-2008/157058 | 12/2008 |
| WO | WO-2011/046549 | 4/2011 |

OTHER PUBLICATIONS

Machine Translation of DE 295 10 199 (no date).*
International Search Report and Written Opinion for corresponding PCT Application No. PCT/US2009/60635 dated Jul. 13, 2010.

* cited by examiner

END MEMBER, GAS SPRING ASSEMBLY AND METHOD

This application is a continuation of U.S. patent application Ser. No. 13/500,448, filed on Apr. 5, 2012, which was the National Stage of International Application No. PCT/US2009/060635, filed on Oct. 14, 2009, the subject matter of each of which is hereby incorporated herein by reference in its entirety.

BACKGROUND

The subject matter of the present disclosure broadly relates to the art of gas spring devices and, more particularly, to an end member for a gas spring assembly, as well as a gas spring assembly and method of assembly that include the same. In particular, an end member in accordance with the subject matter of the present disclosure is formed from thin-walled metal material and includes a plurality of substantially-flat wall sections disposed in one of two or more different planes such that improved performance in offset mounting arrangements may be achieved.

The subject matter of the present disclosure may find particular application and use in conjunction with suspension systems of wheeled vehicles, and may be described herein with reference thereto. However, it is to be appreciated that the subject matter of the present disclosure is also amenable to other applications and environments, and that the specific uses shown and described herein are merely exemplary. For example, the subject matter of the present disclosure could be used in support structures, height adjusting systems and actuators associated with industrial machinery, components thereof and/or other such equipment.

Certain types of gas spring constructions commonly include a flexible wall that is secured between opposing end members. Depending upon the overall type and design of the gas spring, an end member may take the form of a generally flat plate that is secured to an open end of the flexible wall. In some cases, such end members may be referred to in the art as bead plates. Another type or style of end member that is commonly used is often referred to as a roll-off piston. Such end members have a considerably greater height dimension than a bead plate, which permits the flexible wall to roll along a side wall of the piston during use, as is well known in the art.

Much attention has been directed to the design and manufacture of roll-off piston designs in an effort to provide improved performance during use in offset mounting arrangements and conditions. Examples of such designs are embodied in U.S. Pat. No. 4,506,910 to Bierens; U.S. Pat. No. 6,024,343 to Ebert; U.S. Pat. No. 6,527,259 to Nemeth, et al. and U.S. Patent Application Publication No. 2008/211150 to Levy, et al.

To enable existing bead plate designs to withstand the forces and loads that are commonly associated with offset mounting arrangements, a reinforcing plate is sometimes assembled between the bead plate and an offset structural component (e.g., a main beam of a vehicle chassis) to which the gas spring is secured. The reinforcing plate is generally of slightly smaller diameter than the bead plate but is often of considerably greater thickness than the material from which the bead plate is formed. The use of the reinforcing plate can substantially increase the stiffness of the end member and can result in a corresponding reduction in deflection of the bead plate during dynamic use in operation.

Additionally, or in the alternative, a reinforcing bracket and/or plate can be secured on or along the offset structural component, such as by using a welded joint or connection, for example. Such a reinforcing bracket and/or plate will typically project outwardly beyond the offset structural component (e.g., a main beam of a vehicle chassis) and abuttingly engage the portion of the bead plate that would be otherwise unsupported by the offset structural component. As such, as mentioned above, the use of such reinforcing bracket and/or plate can substantially increase the stiffness of the end member and can result in corresponding a reduction in deflection of the bead plate during dynamic use in operation However, certain disadvantages are also commonly identified as being associated with the use of such reinforcing brackets and/or plates. Naturally, it may be desirable to avoid or minimize these and/or other disadvantages. For example, the addition and use of such a reinforcing bracket and/or plate increases the material and, thus, the weight associated with the use of the gas spring assembly. Currently, significant efforts are being made, particularly in vehicle-related applications, to reduce the material usage and thereby reduce the weight of vehicle components. Additionally, the use of additional components also undesirably increases manufacturing and assembly costs associated with the same.

In view of the foregoing, it is believed desirable to develop an end member for a gas spring assembly, as well as a gas spring assembly and method of assembling the same, capable of providing improved performance in offset mounting arrangements and/or overcoming other disadvantages of known constructions while providing and/or maintaining certain desirable qualities and benefits, such as, for example, a relatively low cost of manufacture and ease of assembly.

BRIEF DESCRIPTION

One example of an end member in accordance with the subject matter of the present disclosure that is dimensioned for securement to an open end of an associated gas spring flexible wall can include an end member wall having an outer peripheral extent and that is formed from thin-walled metal material. The end member wall can include a first wall portion that is disposed along the outer peripheral extent and that can include a substantially-flat surface area at least partially defining a first plane of the end member. A second wall portion can be disposed radially outwardly of the first wall portion and can at least partially define the outer peripheral extent of the end member wall. The second wall portion can extend from the first wall portion out of the first plane in a first direction. A third wall portion can be disposed radially inwardly of at least part of the first wall portion and can include a substantially-flat surface area and at least one valley extending depthwise into the end member wall in the first direction and lengthwise across the third wall portion, the substantially-flat surface area at least partially defines a second plane of the end member. The second plane can be disposed in approximate alignment with the first plane and in spaced relation to the first plane in a second direction that is generally opposite the first direction. A first securement feature can be disposed along the substantially-flat surface area of the third wall portion and can be adapted to engage an associated external component.

One example of a gas spring assembly in accordance with the subject matter of the present disclosure can include a flexible wall that extends circumferentially around a longitudinal axis and that includes a first open end and an opposing second open end that is spaced longitudinally from the first open end. A first end member can be secured across the first open end such that a substantially fluid-tight seal is formed therewith. A second end member can be secured across the second open end of the flexible wall in a substantially fluid-tight manner such that a spring chamber is at least partially defined by the flexible wall between the first and second end members. The second end member can include an end member wall that has an outer peripheral extent and that is formed from thin-walled metal material. The end member wall can include a first wall portion that is disposed along the outer peripheral extent and that includes a substantially-flat surface area that at least partially defines a first plane of the second end member. A second wall portion can be disposed radially outwardly of the first wall portion and can at least partially define the outer peripheral extent of the end member wall. The second wall portion can extend from the first wall portion out of the first plane in a first longitudinal direction. A third wall portion can be disposed radially inwardly of at least part of the first wall portion and can include a substantially-flat surface area and at least one valley extending into the end member wall. The substantially-flat surface area at least partially defines a second plane of the second end member. The second plane can be disposed in approximate alignment with the first plane and can be in spaced relation to the first plane in a second longitudinal direction that is generally opposite the first direction. The at least one valley can extend depthwise into the end member wall and can extend lengthwise along at least part of the third wall portion.

One example of a method of assembling a gas spring assembly in accordance with the subject matter of the present disclosure can include an action of providing a flexible wall that extends circumferentially about a longitudinally-extending axis and that extending longitudinally between opposing first and second open ends. The method can also include an action of providing a first end member and securing the first end member across the first open end such that a substantially fluid-tight seal is formed between the first end member and the flexible wall. The method can further include an action of providing a second end member that includes an end member wall having an outer peripheral extent and that is formed from thin-walled metal material. The end member wall can include a first wall portion disposed along the outer peripheral extent and can include a substantially-flat surface area that at least partially defines a first plane of the second end member. A second wall portion can be disposed radially outwardly of the first wall portion and can at least partially define the outer peripheral extent of the end member wall. The second wall portion can extend from the first wall portion out of the first plane in a first longitudinal direction. A third wall portion can be disposed radially inwardly of at least part of the first wall portion and can include a substantially-flat surface area and at least one valley extending into the end member wall. The substantially-flat surface area at least partially defines a second plane of the second end member. The second plane can be disposed in approximate alignment with the first plane and can be disposed in spaced relation to the first plane in a second longitudinal direction generally opposite the first direction. The at least one valley can extend depthwise into the end member wall and lengthwise across the third wall portion. The method can also include an action of securing the second end member across the second open end of the flexible wall such that a substantially fluid-tight seal is formed between the second end member and the flexible wall.

DETAILED DESCRIPTION

Figure 1:
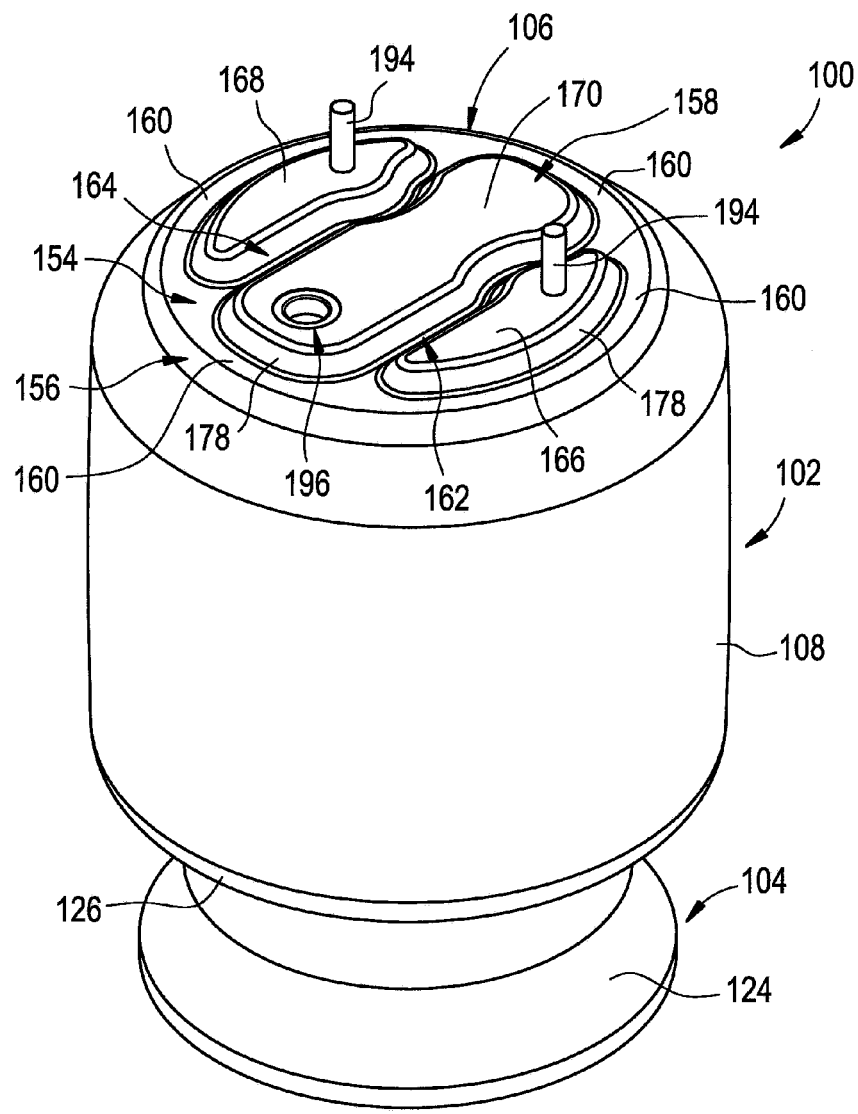
FIG. 1 is a perspective view of a gas spring assembly that includes one example of an end member in accordance with the subject matter of the present disclosure.
Figure 2:
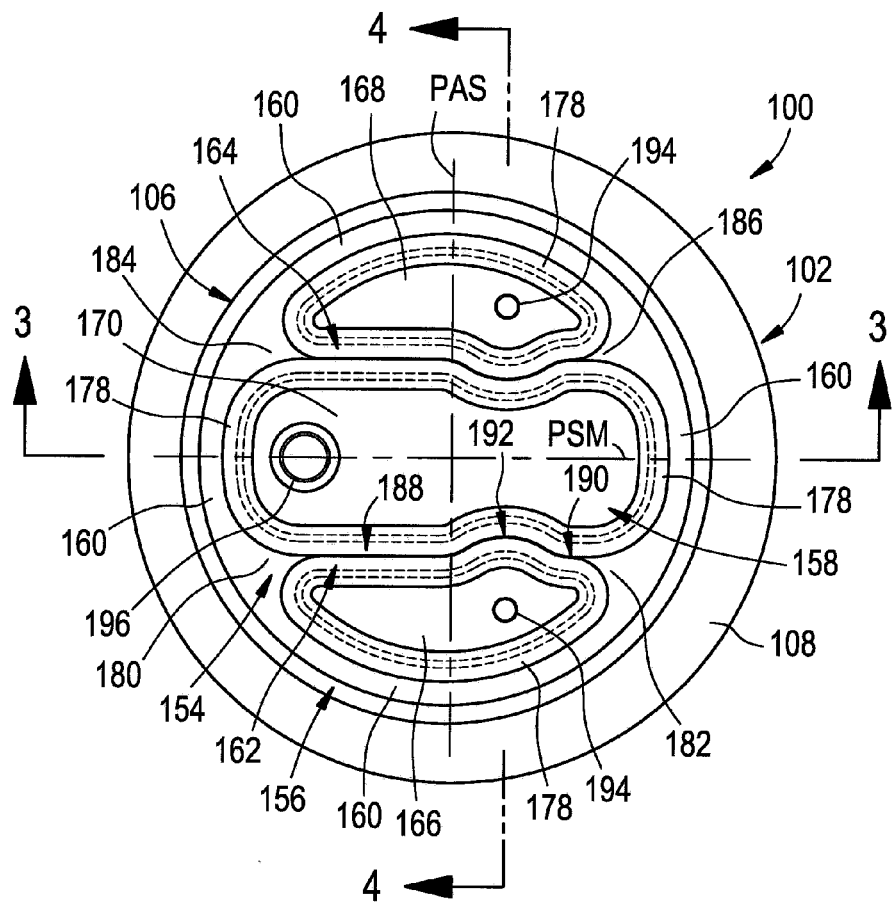
FIG. 2 is a top plan view of the gas spring assembly in FIG. 1.

It will be appreciated that a gas spring assembly in accordance with the subject matter of the present disclosure can be of any suitable type, kind, configuration and/or arrangement having a flexible wall, such as convoluted bellows-type construction or a rolling lobe-type construction, for example. Generally, such a gas spring assembly can include a flexible wall and opposing first and second end members. In the case of a convoluted bellows-type construction, the flexible wall can have one or more convolutions and can include end members that take the form of low-profile plates that are secured to the ends of the flexible wall. Alternately, a rolling lobe-type construction can include an elongated sleeve-type flexible wall with one end member that takes the form of a roll-off piston, such as is shown and described herein, for example. It is to be distinctly understood, however, that the embodiments shown and described herein are merely exemplary and that any other suitable arrangement and/or configuration of gas spring assembly could alternately be used.

Additionally, it will be appreciated that a gas spring assembly in accordance with the subject matter of the present disclosure can be installed or otherwise secured between spaced-apart structural components in any suitable manner and/or arrangement. As described hereinafter, an end member and gas spring assembly in accordance with the subject matter of the present disclosure may find particular application and use in connection with arrangements in which one or both of the end members of the gas spring assembly are offset or otherwise partially unsupported by the associated structural components to which the end member or end members are secured. However, it is to be recognized that such an end member and/or gas spring assembly are expected to be capable of broad use and that the specific mounting arrangements shown and described herein are merely exemplary and not intended to be limiting.

Turning, now, to the drawings, which are intended to illustrate examples of the subject matter of the present disclosure and which are not intended to be in anyway limiting, FIGS. 1-4 illustrate a gas spring assembly 100 in accordance with the subject matter of the present disclosure that includes a gas spring sleeve or bellows, such as a flexible sleeve 102, for example, a first end member, such as a roll-off piston 104, for example, and a second end member, such as a bead plate 106, for example. Gas spring assembly is disposed between a first or upper structural component USC and a second or lower structural component LSC that is spaced from the upper structural component.

Flexible sleeve 102 includes a flexible wall 108 that extends circumferentially around a longitudinal axis AX and longitudinally between opposing first and second open ends 110 and 112. Flexible wall 108 can be of any suitable type and/or kind and can be constructed from any suitable material or combination of materials, such as may be known in the art. As one example, flexible wall 108 can include one or more layers or plies of elastomeric material (e.g., rubber and/or thermoplastic elastomer) and one or more layers or plies of reinforcement filaments (e.g., polyamide and/or polyimide fibers). It will be appreciated, however, that any other suitable material or combination of materials could alternately be used.

Flexible sleeve 102 can optionally include a mounting bead disposed along an end of the flexible wall. In the exemplary embodiment shown, flexible sleeve 102 includes a first mounting bead 114 disposed along first open end 110 and a second mounting bead 116 disposed along second open end 112. The first and second mounting beads are shown as including an optional reinforcement element 118, which is sometimes referred to in the art as a bead wire, that is at least partially embedded within the flexible wall.

Piston 104 is shown as extending between a first or lower end 120 and a second or upper end 122 with an outer side wall 124 extending in a generally longitudinal manner therebetween. In use, flexible wall 108 of flexible sleeve 102 forms a rolling-lobe 126 that is displaced along side wall 124 as the gas spring undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of the piston assembly. As such, it will be appreciated that the profile or shape of side wall 124 is merely exemplary and that any one or more portions can be included, such as, for example, may have an approximately frustoconical or tapered shape, a curvilinear shape and/or an approximately cylindrical shape.

Piston 104 includes a first or lower end wall 128 that extends generally transverse (e.g., perpendicular) to side wall 124. Lower end wall 128 is shown as abuttingly engaging lower structural component LSC and can be secured thereto in any suitable manner, such as by using one or more threaded fasteners FST that can extend through the lower structural component and threadably engage threaded holes 130, which can optionally be provided in piston 104. Piston 104 is also shown as including a second or upper end wall 132 that is disposed along upper end 122 and includes a first wall portion 134 extending generally transverse (e.g., perpendicular) to side wall 124 and a second wall portion 136 that extends between and transitions from the first wall portion to side wall 124.

Figure 3:
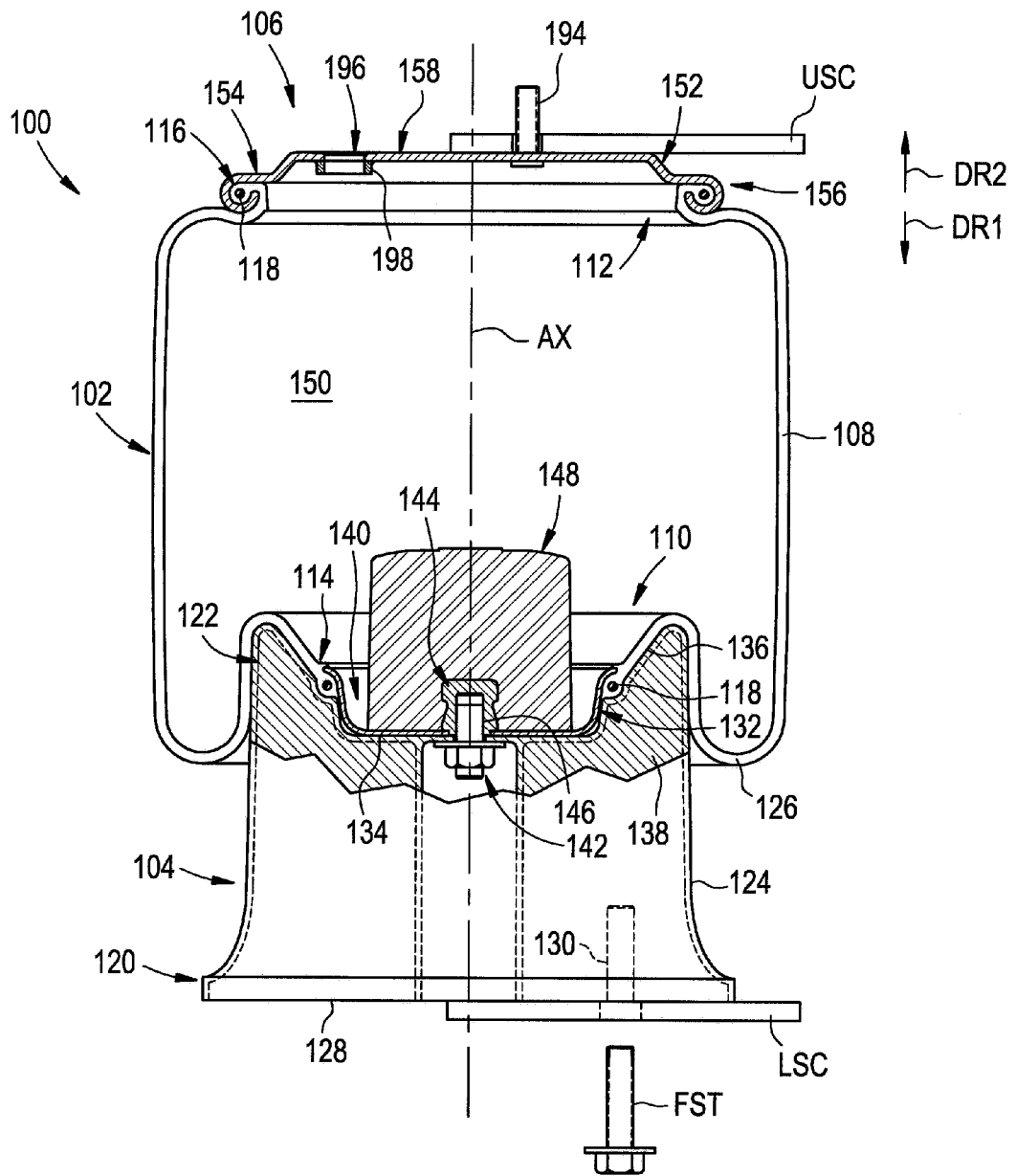
FIG. 3 is a cross-sectional side view of the gas spring assembly in FIGS. 1 and 2 taken along line 3-3 in FIG. 2.
Figure 4:
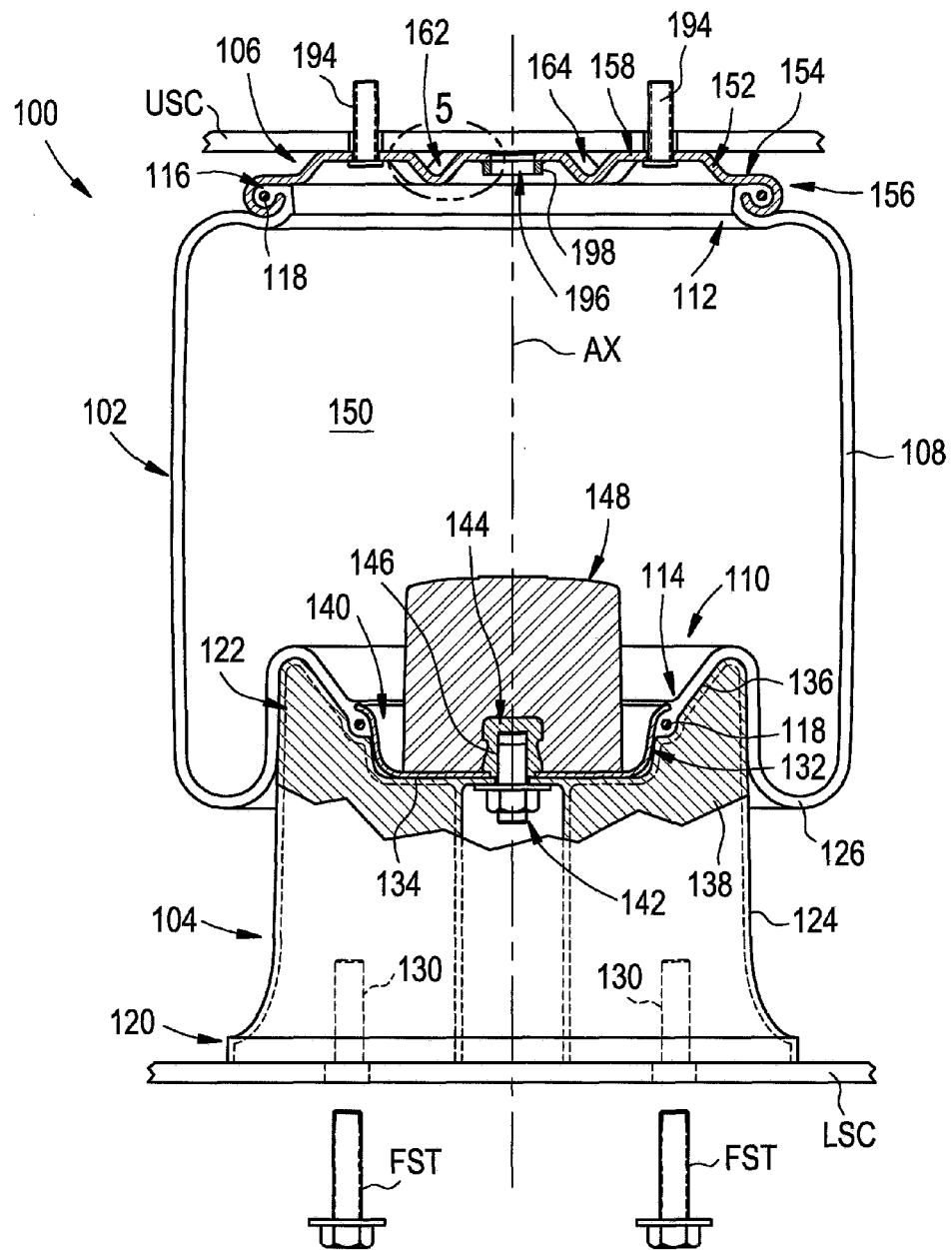
FIG. 4 is a cross-sectional side view of the gas spring assembly in FIGS. 1-3 taken along line 4-4 in FIG. 2.
Figure 5:
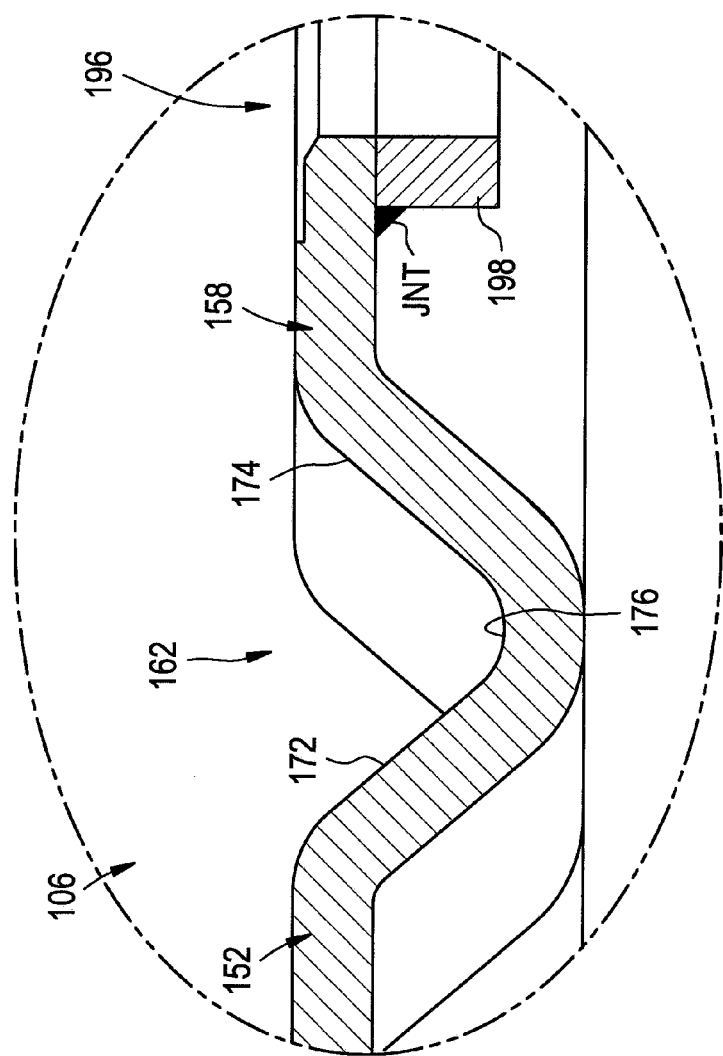
FIG. 5 is an enlarged cross-sectional side view of the portion of the end member in FIGS. 1-4 identified in Detail 5 of FIG. 4.

While it will be appreciated that any suitable construction and/or arrangement of features can be used in forming piston 104, the exemplary arrangement shown in FIGS. 3 and 4 illustrate the use of an inner side wall 134 that extends generally longitudinally between lower and upper ends 128 and 132. Additionally, radially-extending support walls 138 can optionally be included that extend between the inner side wall and the outer side wall.

First open end 110 of flexible sleeve 102 can be secured to the first end member (e.g., piston 104) in any suitable manner. In the exemplary arrangement shown, an end closure 140 or other such component can be received within the first open end and abuttingly engage first mounting bead 114 such that a substantially fluid-tight seal (e.g., approximately watertight or approximately airtight) is formed therebetween. End closure 140 can be secured to piston 104 in any suitable manner, such as by using a threaded fastener 142 that threadably engages a corresponding threaded passage. In the exemplary embodiment shown, a bumper mount 144 abuttingly engages end closure 140 and includes a threaded passage 146 dimensioned to threadably receive fastener 142. It will be appreciated, however, that any other arrangement and/or configuration could alternately be used. Optionally, a jounce bumper 148 of any suitable type, kind, construction and/or configuration can be received on bumper mount 144 and/or otherwise secured within the gas spring assembly.

As discussed above, the second end member of a gas spring assembly can be secured to the flexible sleeve in any manner suitable for forming a substantially fluid-tight seal (e.g., approximately watertight or approximately airtight) therebetween. In the exemplary arrangement shown in FIGS. 1-4, bead plate 106 is secured to second mounting bead 116 along second open end 112 of flexible sleeve 102 such that a substantially fluid-tight seal (e.g., approximately watertight or approximately airtight) is formed therebetween. As such, a gas or spring chamber 150 is at least partially defined by flexible sleeve 102 between the first and second end members.

Figure 6:
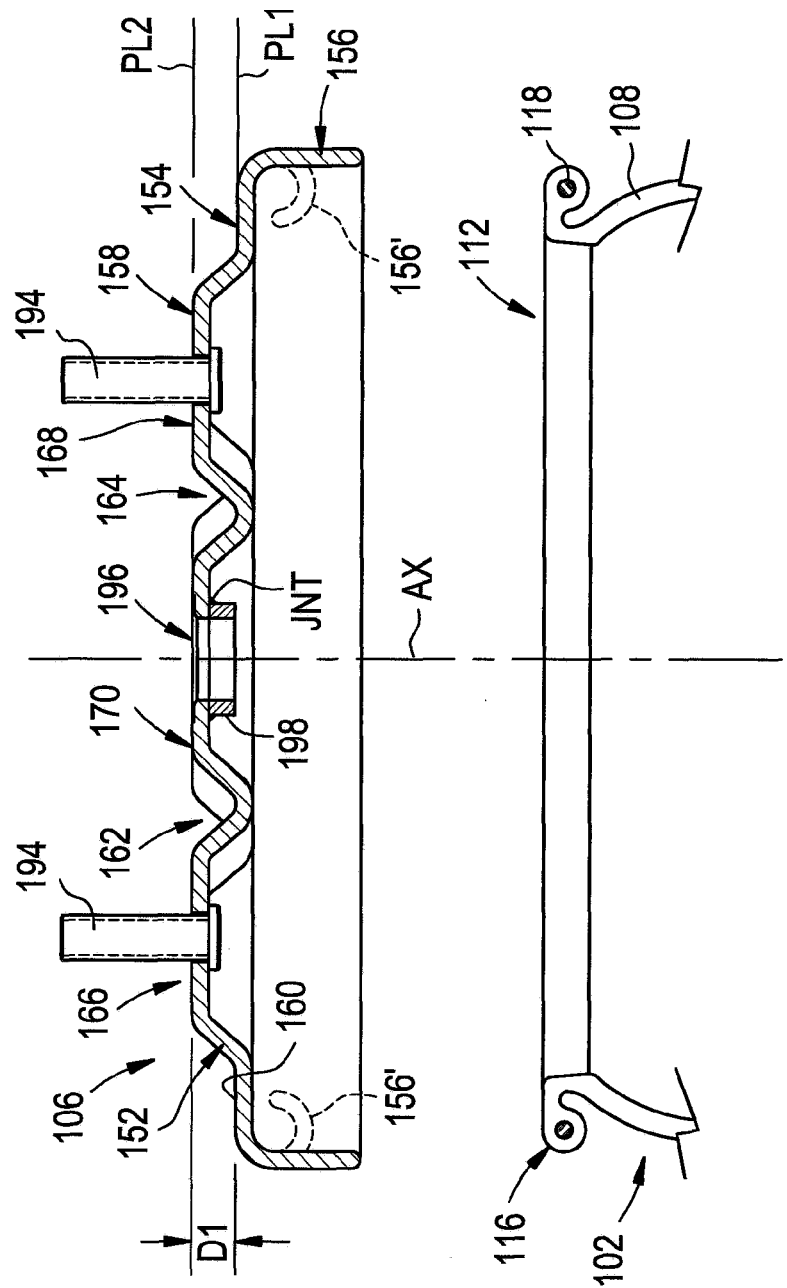
FIG. 6 is an exploded cross-sectional side view of a portion of the end member and flexible wall in FIGS. 1-4 prior to assembly.

Bead plate 106 includes an end member wall 152 that can be formed in any suitable manner and from any suitable material or combination of materials. As one example, end member wall 152 could be formed from thin-walled metal material, such as steel or aluminum, for example. In a preferred arrangement, the end member wall is formed from a single, unitary section of metal material, such as sheet material or a pre-cut blank, for example, that has a substantially uniform cross-sectional thickness. The sheet material or blank can then be pressed, stamped or otherwise formed into a desired shape, such as is shown in FIG. 6, for example, such that the incurrence of additional time and costs may be minimized or at least reduced, such as may be associated with joining materials, machining additional features and/or other manufacturing techniques and processes, for example. In one preferred arrangement, the end member wall can be formed from a single, unitary section of steel material having a substantially uniform thickness within a range of from approximately $1/16$ of an inch to approximately $1/4$ of an inch. Additionally, in a preferred arrangement, the end member wall will have a finished or formed thickness that is approximately uniform and also within a range of approximately $1/16$ of an inch to approximately $1/4$ of an inch.

End member wall 152 is shown in FIGS. 1-6 as including first, second and third wall portions, which are generally identified by item numbers 154, 156 and 158, respectively. First wall portion 154 of end member wall 152 includes at least one substantially-flat surface area that at least partially defines a first plane PL1 (FIG. 6) of the second end member (e.g., bead plate 106). As one example, the at least one substantially-flat surface area of first wall portion 154 can include a surface area 160 that extends at least partially around the outer peripheral extent of the end member wall. In the exemplary embodiment shown, surface area 160 extends circumferentially around the end member wall in a substantially endless manner. It will be appreciated, however, that any other arrangement and/or configuration could alternately be used.

In the exemplary arrangement shown in FIGS. 1-6, second wall portion 156 of end member wall 152 extends from first wall portion 154 out of and away from first plane PL1 in a first direction, as is generally represented in FIG. 3 by arrow DR1.

Prior to assembly, such as is illustrated in FIG. 6, for example, second wall portion 156 can extend in an approximately longitudinal direction and can be approximately cylindrical in shape. In the alternative, second wall portion 156 can be disposed at an inwardly or outwardly extending angle with respect to longitudinal axis AX prior to assembly. Additionally, second wall portion 156 can, prior to assembly, be formed or otherwise disposed in any other suitable shape or arrangement, such as curvilinear and/or frustoconical shape, for example. Furthermore, second wall portion 156 can take any suitable shape, form, arrangement and/or configuration in the assembled condition, such as is shown in FIGS. 1-4, for example. In the exemplary arrangement shown, second wall portion 156 is formed into a curved shape, such as is represented in dashed lines by item number 156' in FIG. 6, for example, that abuttingly engages and captures second mounting bead 116 of flexible sleeve 112 such that a substantially fluid-tight seal (e.g., approximately watertight or approximately airtight) is formed therewith. It will be appreciated, however, that other arrangements could alternately be used.

Second wall portion 156 is also shown as being disposed radially outwardly of first wall portion 154 such that the second wall portion at least partially defines an outer peripheral extent of end member wall 152. It will be appreciated, however, that other configurations and/or arrangements could alternately be used in which some, if not all, of the second wall portion is disposed radially inwardly of the first wall portion such that the first wall portion at least partially defines the outer peripheral extent of the end member wall.

Third wall portion 158 includes at least one substantially-flat surface area that at least partially defines a second plane PL2 (FIG. 6) of the second end member (e.g., bead plate 106). The at least one substantially-flat surface area of the third wall portion is disposed in spaced relation to the at least one substantially-flat surface area of first wall portion 154 (e.g., surface area 160) in a second direction that is generally opposite the first direction, as is generally represented in FIG. 3 by arrow DR2. In one exemplary arrangement, first plane PL1 and second plane PL2 are disposed in approximate alignment with one another. An offset is formed between the substantially-flat surface areas of the first and third wall portions, as is represented by dimension D1 in FIG. 6. The offset, which is represented by dimension D1 can be of any suitable value or amount, such as an amount within a range of approximately 2 times to approximately 5 times the nominal thickness of the material from which the end member wall is made. As another example, the offset can be a value or amount within a range of approximately ⅟32 of an inch to approximately 1¼ inches. In a preferred arrangement, offset D1, in combination with the configuration and/or arrangement of geometric features of the end member wall and inclusive of any additional geometric features that may be described hereinafter, will be sufficiently large to increase the moment of inertia of the bead plate cross section, after securement to an open end of a flexible wall, by at least a factor of 2 compared with a conventional flat bead plate, after securement to an open end of a flexible wall in substantially the same manner.

Additionally, third wall portion 158 can optionally include one or more valleys, which may in the alternative be referred to herein as channels or grooves, that extend into end member wall 152 in approximately first direction DR1. The one or more valleys can separate the at least one substantially-flat surface area formed by third wall portion 158 into two or more substantially-flat surface area sections that are spaced apart from one another by a valley that is at least partially disposed therebetween. In the exemplary arrangement shown in FIGS. 1-6, third wall portion 158 includes two valleys 162 and 164 that extend lengthwise along or across the third wall portion of end member wall 152 and separate the at least one substantially-flat surface area thereof into three substantially-flat surface area sections, which are identified as first, second and third surface area sections 166, 168 and 170. In the exemplary embodiment shown, first and second surface area sections 166 and 168 are spaced apart from one another with third surface area section 170 disposed therebetween.

The one or more valleys formed into the end member wall, such as valleys 162 and 164, for example, can take any suitable shape, form, configuration and/or arrangement and can be formed into or otherwise provided on the end member wall in any suitable manner. In a preferred arrangement, the material of the end member wall will be stamped, pressed or otherwise deformed into an arrangement or configuration that includes the one or more valleys. In the exemplary arrangement shown and described herein, first and second valleys 162 and 164 are formed into the end member wall such that each valley includes first and second side wall portions 172 and 174 (FIG. 5) that extend from the at least one substantially-flat surface area of the third wall portion in approximately first direction DR1. Valleys 162 and 164 are also shown as including a bottom wall portion 176 that extends between and generally connects the first and second side wall portions. In one exemplary arrangement, bottom wall 176 or a surface thereof can be disposed in approximate alignment with first wall portion 154 and/or first plane PL1 thereof. Alternately, however, the bottom wall could be disposed in first direction DR1 a distance less than or greater than that offset D1.

Third wall portion 158 also includes an outer periphery 178 that interconnects with first wall portion 154. Valleys 162 and 164 can optionally interface with outer periphery 178 at one or more intersections. In the exemplary arrangement shown herein, valley 162 interfaces with outer periphery 178 at opposing ends of the valley, which are identified by first and second intersections 180 and 182. Similarly, valley 164 is shown as interfacing with outer periphery 178 at opposing ends, as are identified by third and fourth intersections 184 and 186.

Additionally, the one or more valleys, such as valleys 162 and 164, for example, can optionally include two or more sections or valley segments that are disposed in approximate alignment and/or otherwise operatively interconnected with one another. For example, each of valleys 162 and 164 can include first, second and third valley segments, which are identified by item numbers 188, 190 and 192 in FIG. 2, respectively. In the exemplary arrangement shown, first and second valley segments 188 and 190 extend in an approximately linear direction and are disposed in approximate alignment with one another in each of valleys 162 and 164. Additionally, the first and second valley segments of the first and second valleys are disposed in approximate alignment such that first and third intersections 180 and 184 are spaced apart from one another approximately the same distance as second and fourth intersections 182 and 186 are from one another. Furthermore, third valley segments 192 of both the first and second valleys are non-aligned with the first and second valley segments that are interconnected thereby. In the arrangement shown, third valley segments 192 can take a curved or other non-linear shape.

As discussed above, gas spring assembly 100 can be secured on or along one or more associated structural components in any suitable manner. As shown in FIGS. 3 and 4, bead plate 106 is disposed along upper structural component USC such that the at least one substantially-flat surface area (e.g., first, second and third surface area sections 166, 168 and 170) of third wall portion 158 is in abutting engagement with the upper structural component. Additionally, as shown in FIG. 3, gas spring assembly 100 is installed in an offset mounting arrangement between the upper and lower structural components, which subjects the bead plate and piston to moment or bending loads as the forces acting on the spring and gas pressure within the spring are transferred through the end members. As such, only a portion of the first, second and third surface area sections are abuttingly engaging the upper structural component.

The second end member can also include one or more securement features, such as may be used to secure the end member on an associate structural component and/or secure an associated external component (e.g., a gas line fitting) on the second end member. In the arrangement shown, bead plate 106 includes a plurality of securement features, such as, for example, first and second threaded projections or studs 194 that project from third wall portion 158 in second direction DR2. Optionally, a threaded passage 196 can extend into the end member wall from along the third wall portion in first direction DR1. A threaded boss 198 can be secured on or along the end member wall, such as by using a welded or brazed joint JNT, for example, to provide additional strength to the connection.

In the exemplary arrangement shown in FIGS. 1-6, valleys 162 and 164 together with first, second and third surface area sections 166, 168 and 170 are arranged or otherwise configured in a manner that establishes a plane of symmetry PSM (FIG. 2) extending longitudinally through end member wall 152. The valleys and surface area sections are also configured in a manner that establishes a plane of asymmetry PAS (FIG. 2) that also extends longitudinally through the end member wall of the second end member. However, plane of asymmetry PAS is disposed in generally transverse relation to plane of symmetry PSM. And, both the plane of symmetry and the plane of asymmetry are disposed at least approximately along and extend at least approximately through longitudinal axis AX (FIGS. 3 and 4) of bead plate 106.

It is to be understood that the planes of symmetry and asymmetry described above are generally established by the one or more valleys extending into and/or otherwise along the end member wall to the exclusion of any securement features that may be disposed on or along the end member wall (e.g., first and second threaded studs 194 and threaded passage 196). That is, the establishment of plane of symmetry PSM and plane of asymmetry PAS is based on the position, orientation and/or configuration of the one or more valleys (e.g., valleys 162 and 164) as the same extend into end member wall 152 regardless of the position, arrangement, orientation and/or alignment of any of the one or more securement features that may be included on or along end member wall 152 to form bead plate 106. In the exemplary arrangement shown in FIGS. 1-6, however, first and second threaded projections 194 are disposed on opposing sides of plane of symmetry PSM and on a common side of plane of asymmetry PAS. It will be appreciated, however, that other arrangements could alternately be used.

Figure 7:
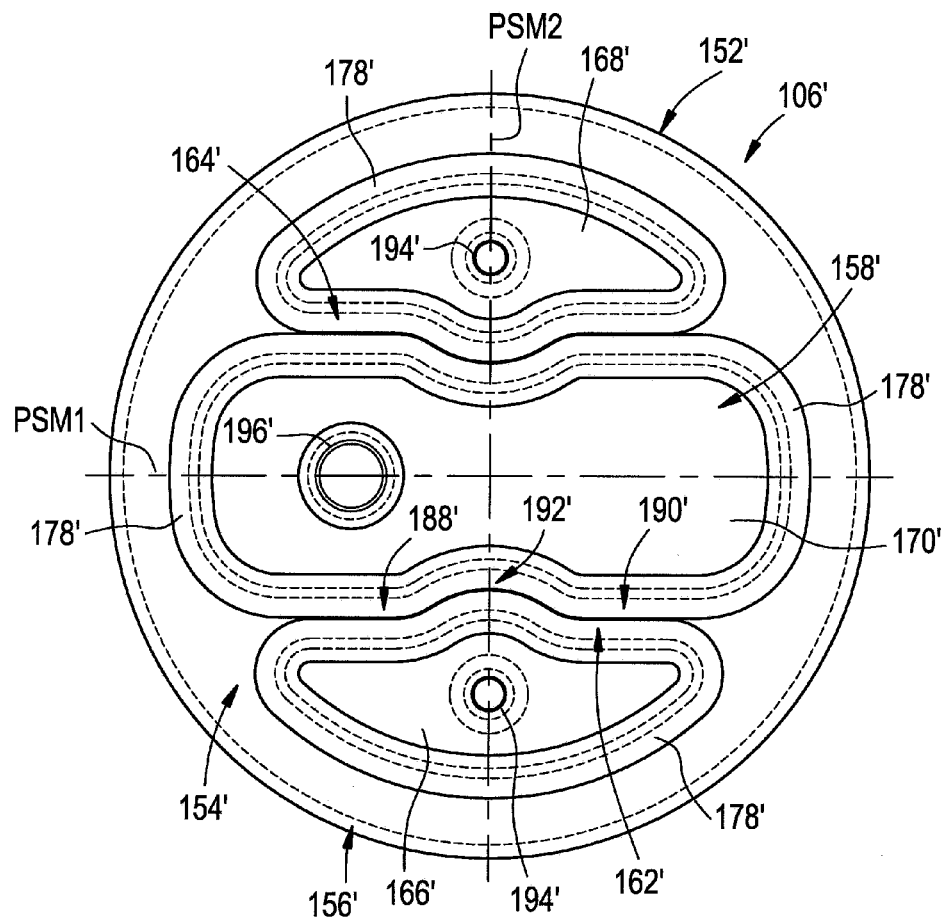
FIG. 7 is a top plan view of another example of an end member in accordance with the subject matter of the present disclosure shown prior to assembly on a flexible wall.

Another example of an end member in accordance with the subject matter of the present disclosure is illustrated in FIG. 7 as bead plate 106'. It will be appreciated that bead plate 106' is substantially similar to bead plate 106, such as has been described above in connection with FIGS. 1-6. Thus, certain details that are described above in connection with bead plate 106 may not be repeated here but are, nonetheless, intended to apply to or otherwise describe bead plate 106' unless specifically noted otherwise.

Bead plate 106' includes an end member wall 152' that includes first, second and third wall portions, which are respectively identified in FIG. 7 using item numbers 154', 156' and 158'. Third wall portion 158' includes first and second valleys 162' and 164' that can be formed into or otherwise provided on or along end member wall 152', such as in a manner similar to that described above in connection with valleys 162 and 164, for example. Valleys 162' and 164' separate third wall portion 158' into three substantially-flat surface area sections, which are identified in FIG. 7 using item numbers 166', 168' and 170'. As previously described in connection with end member wall 152, first and second threaded projections or studs 194' are disposed along third wall portion 158' and, as shown, can be positioned on first and second surface area sections 166' and 168'. Optionally, a threaded passage 196' can extend into the end member wall from along third wall portion 158' and, as shown in FIG. 7, can be positioned on third surface area section 170', such as has been described above with regard to threaded passage 196 and threaded boss 198, for example.

Third wall portion 158' also includes an outer periphery 178' that interconnects with first wall portion 154'. First and second valleys 162' and 164' can optionally intersect with outer periphery 178', such as has been discussed above in connection with valleys 162 and 164 and outer periphery 178, for example. Additionally, valleys 162' and 164' can optionally include two or more sections or valley segments that are disposed in approximate alignment and/or otherwise operatively interconnected with one another. For example, each of valleys 162' and 164' can include first, second and third valley segments, which are respectively identified by item numbers 188', 190' and 192' in FIG. 7.

In the exemplary arrangement shown, first and second valley segments 188' and 190' extend in an approximately linear direction and are disposed in approximate alignment with one another along each of valleys 162' and 164'. Additionally, the first and second valley segments of the first and second valleys are disposed in approximate alignment such that the intersections of the valleys with outer periphery 178' are spaced apart from one another approximately the same distance, such as has been described above. Furthermore, third valley segments 192' of both the first and second valleys are non-aligned with the first and second valley segments that are interconnected thereby. In the arrangement shown, third valley segments 192' can take a curved or other non-linear shape.

Valleys 162' and 164', which are shown in FIG. 7, differ from valleys 162 and 164 in FIGS. 1-6 in that first and second valley segments 188' and 190' of valleys 162' and 164' are of at least approximately equal length, rather than being of unequal length, as in valley segments 188 and 190. As such, third valley segments 192' are approximately centered in at least one direction along end member wall 152'. As a result, valleys 162' and 164' establish first and second planes of symmetry PSM1 and PSM2 through end member wall 152'. The first and second planes of symmetry are disposed generally transverse to one another and extend at least approximately through an axis (e.g., longitudinal axis AX in FIGS. 3 and 4) of bead plate 106'.

As described above, however, it is to be understood that the planes of symmetry are generally established by the one or more valleys extending into and/or otherwise along the end member wall to the exclusion of any securement features that may be disposed on or along the end member wall (e.g., first and second threaded studs 194' and threaded passage 196'). That is, the establishment of the two planes of symmetry PSM1 and PSM2 is based on the position, orientation and/or configuration of the one or more valleys (e.g., valleys 162' and 164') as the same extend into end member wall 152' regardless of the position, arrangement, orientation and/or alignment of any of the one or more securement features that may be included on or along end member wall 152' to form bead plate 106'. In the exemplary arrangement shown in FIG. 7, however, first and second threaded projections 194' are disposed on opposing sides of first plane of symmetry PSM1 and in approximate alignment with second plane of asymmetry PSM2. Additionally, threaded passage 196' is disposed in approximate alignment with first plane of symmetry PSM1 and on one side of second plane of symmetry PSM2. It will be appreciated, however, that other arrangements could alternately be used.

Figure 8:
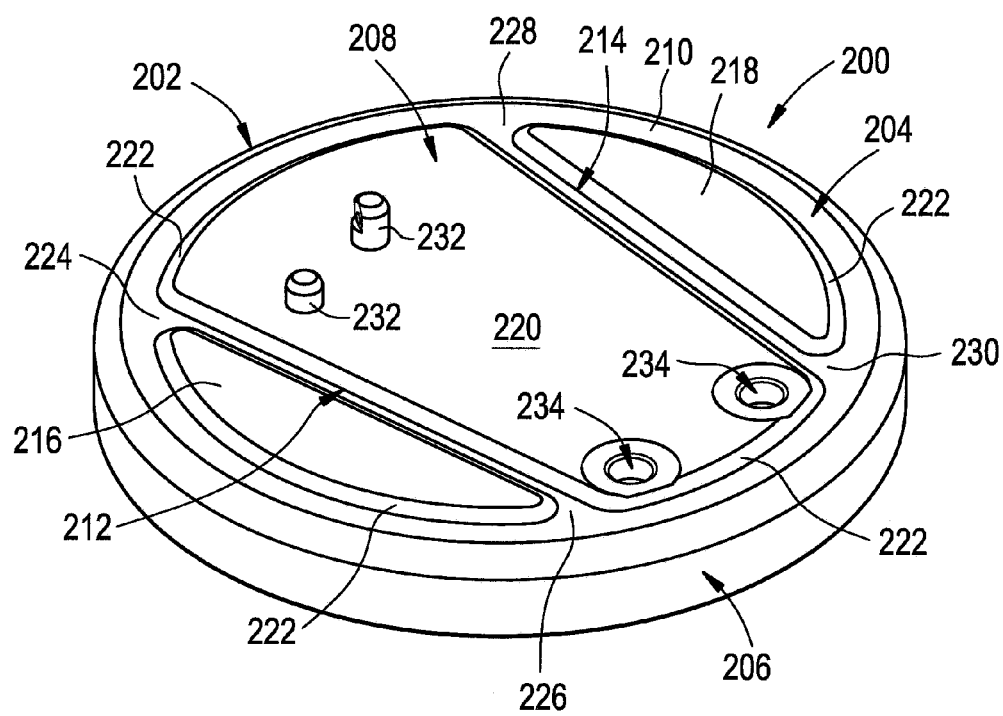
FIG. 8 is a perspective view of a further example of an end member in accordance with the subject matter of the present disclosure shown prior to assembly on a flexible wall.
Figure 9:
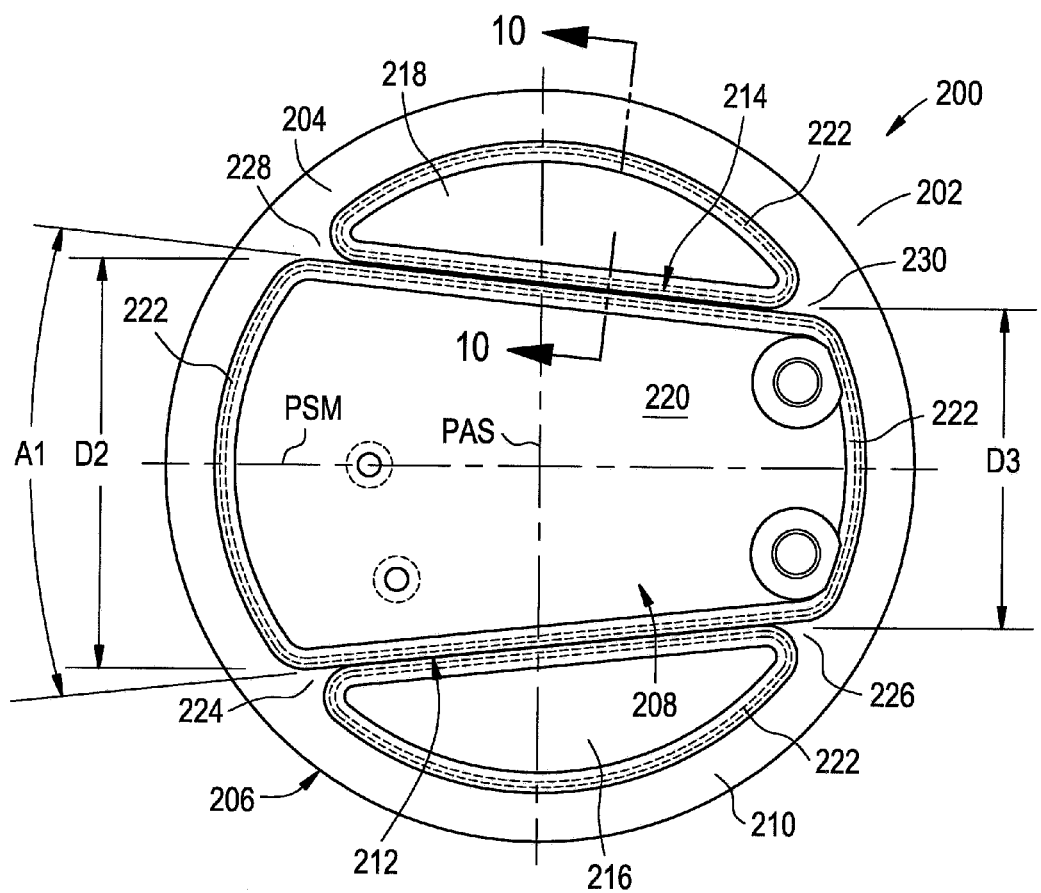
FIG. 9 is a top plan view of the end member in FIG. 8.
Figure 10:
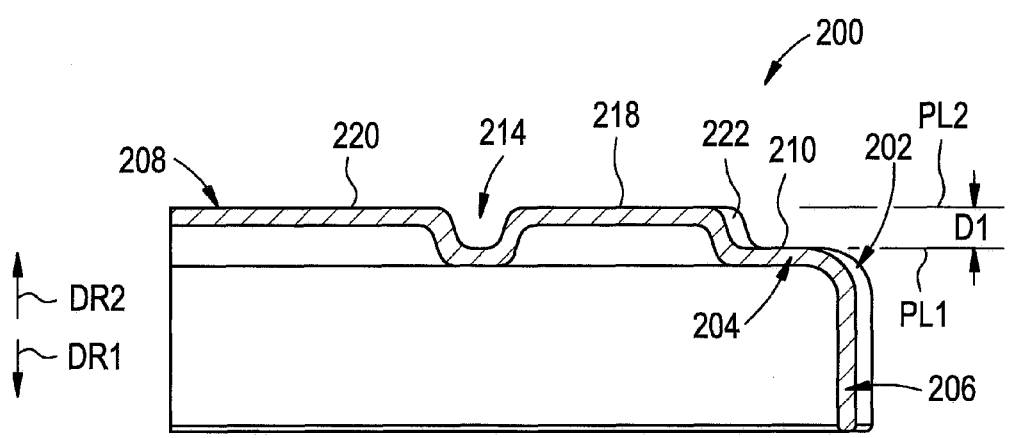
FIG. 10 is a cross-sectional side view of a portion of the end member in FIGS. 8 and 9 taken along line 10-10 in FIG. 9.

A further example of an end member in accordance with the subject matter of the present disclosure is illustrated in FIGS. 8-10 as bead plate 200. It will be recognized that bead plate 200 is shown prior to assembly on an open end of a flexible sleeve or bellows of a gas spring, such as second open end 112 of flexible sleeve 102, for example, and that the bead plate can be secured on or along such an open end in any suitable manner, such as has been described above with regard to bead plate 106 and flexible sleeve 102, for example.

Bead plate 200 is shown in FIGS. 8-10 as including an end member wall 202 that can be formed in any suitable manner and from any suitable material or combination of materials. As one example, bead plate 200 can be formed from materials and/or processes similar to those discussed above in connection with end member wall 152 of bead plate 106. As one example, end member wall 202 of bead plate 200 could be formed from thin-walled metal material, such as steel or aluminum, for example. In a preferred arrangement, the end member wall is formed from a single, unitary section of metal material, such as sheet material or a pre-cut blank, for example, that has a substantially uniform cross-sectional thickness.

Additionally, such sheet material or pre-cut blank can then be pressed, stamped or otherwise formed into a desired shape, such as is shown in FIGS. 8-10, for example, such that the incurrence of additional time and costs may be minimized or at least reduced, such as may be associated with joining materials, machining additional features and/or other manufacturing techniques and processes, for example. In one preferred arrangement, the end member wall can be formed from a single, unitary section of steel material having a substantially uniform thickness within a range of from approximately 1/16 of an inch to approximately 1/4 of an inch. Additionally, in a preferred arrangement, the end member wall will have a finished or formed thickness that is approximately uniform and also within a range of approximately 1/16 of an inch to approximately 1/4 of an inch.

It will be appreciated that bead plate 200 can be generally similar in overall construction and configuration to bead plate 106. Certain details that are described above in connection with bead plate 106 and/or the connection thereof to flexible sleeve 102 and upper structural component USC may not be repeated here but are, nonetheless, intended to apply to or otherwise describe bead plate 200 as well, unless otherwise specifically described.

End member wall 202 is shown in FIGS. 8-10 as including first, second and third wall portions, which are generally identified by item numbers 204, 206 and 208, respectively. First wall portion 204 includes at least one substantially-flat surface area that at least partially defines a first plane PL1 (FIG. 10) of the second end member (e.g., bead plate 200). As one example, the at least one substantially-flat surface area of first wall portion 204 can include a surface area 210 that extends at least partially around an outer peripheral extent of the end member wall.

Second wall portion 206 of end member wall 202 extends from first wall portion 204 out of and away from first plane PL1 in a first direction, as is generally represented in FIG. 10 by arrow DR1. Prior to assembly, second wall portion 206 can, as one example, extend in an approximately longitudinal direction and can be approximately cylindrical in shape. Second wall portion 206 is also shown in FIGS. 8-10 as being disposed radially outwardly of first wall portion 204 such that the second wall portion at least partially defines an outer peripheral extent of end member wall 202. It will be appreciated, however, that other configurations and/or arrangements could alternately be used. For example, some, if not all, of the second wall portion could be disposed radially inwardly of the first wall portion such that the first wall portion at least partially defines the outer peripheral extent of the end member wall.

Third wall portion 208 includes at least one substantially-flat surface area that at least partially defines a second plane PL2 (FIG. 10) of the second end member (e.g., bead plate 200). The at least one substantially-flat surface area of the third wall portion is disposed in spaced relation to the at least one substantially-flat surface area of first wall portion 204 (e.g., surface area 210) in a second direction that is generally opposite the first direction, as is generally represented in FIG. 10 by arrow DR2. In one exemplary arrangement, first plane PL1 and second plane PL2 are disposed in approximate alignment with one another. An offset is formed between the substantially-flat surface areas of the first and third wall portions, as is represented by dimension D1 in FIG. 10. It will be appreciated that preferred relative dimensions, features and characteristics of offset D1, in combination with the configuration and/or arrangement of geometric features of the end member wall and inclusive of any additional geometric features that may be described hereinafter, have been described above in detail and are not repeated here.

Additionally, third wall portion 208 can optionally include one or more valleys, which may in the alternative be referred to herein as channels or grooves, that extend into end member wall 202 in approximately first direction DR1. The one or more valleys can separate the at least one substantially-flat surface area formed by third wall portion 208 into two or more substantially-flat surface area sections that are spaced apart from one another by a valley that is at least partially disposed therebetween. In the exemplary arrangement shown in FIGS. 8-10, third wall portion 208 includes two valleys 212 and 214 that extend lengthwise along or across the third wall portion of end member wall 202 and separate the at least one substantially-flat surface area thereof into three substantially-flat surface area sections, which are identified as first, second and third surface area sections 216, 218 and 220. In the exemplary embodiment shown, first and second surface area sections 216 and 218 are spaced apart from one another with third surface area section 220 disposed therebetween.

Third wall portion 208 also includes an outer periphery 222 that interconnects with first wall portion 204. Valleys 212 and 214 can optionally interface with outer periphery 222 at one or more intersections. In the exemplary arrangement shown herein, valley 212 interfaces with outer periphery 222 at opposing ends of the valley, which are identified by first and second intersections 224 and 226. Similarly, valley 214 is shown as interfacing with outer periphery 222 at opposing ends, as are identified by third and fourth intersections 228 and 230.

The one or more valleys formed into the end member wall, such as valleys 212 and 214, for example, can take any suitable shape, form, configuration and/or arrangement and can be formed into or otherwise provided on the end member wall in any suitable manner, such as has been described in detail above in connection with valleys 162 and 164, for example. Valleys 212 and 214 differ from the valleys that have been previously shown and described herein in that the valleys 212 and 214 are disposed in a generally non-aligned arrangement relative to one another, whereas at least a portion of valleys 162 and 164 are disposed in approximate alignment with one another. As illustrated in FIGS. 8 and 9, valleys 212 and 214 extend along or otherwise across third wall portion 208 in an approximately linear configuration. However, valleys 212 and 214 are disposed at an angle relative to one another, as is identified in FIG. 9 by reference dimension A1. As such, the first and second valleys are disposed in an alignment in which the first and third intersections 224 and 228 are spaced apart from one another by a first distance and the second and fourth intersections 226 and 230 are spaced apart from one another by a second distance that is less than the first distance, as is represented in FIG. 9 by reference dimensions D2 and D3, respectively.

As discussed in detail above in connection with other embodiments, bead plate 200 can optionally include one or more securement features, such as may be used to secure the second end member on an associate structural component and/or secure an associated external component (e.g., a gas line fitting) on the second end member. In the arrangement shown, bead plate 200 includes a plurality of securement features, such as, for example, first and second threaded projections or studs 232 that project from third wall portion 208 in second direction DR2. Additionally, or in the alternative, one or more passages can extend into or otherwise be provided on the third wall portion. In the exemplary arrangement shown in FIGS. 8-10, two threaded passages 234 extend into the bead plate in approximately first direction DR1. A threaded boss (not shown) can be secured on or along the end member wall, such as by using a welded or brazed joint (not shown), for example, to provide additional strength or support to the threaded connection along the passages.

In the exemplary arrangement shown in FIGS. 8-10, valleys 212 and 214 together with first, second and third surface area sections 216, 218 and 220 are arranged or otherwise configured in a manner that establishes a plane of symmetry PSM (FIG. 9) extending longitudinally through end member wall 202. The valleys and surface area sections are also configured in a manner that establishes a plane of asymmetry PAS (FIG. 9) that also extends longitudinally through the end member wall of the second end member. However, plane of asymmetry PAS is disposed in generally transverse relation to plane of symmetry PSM. And, both the plane of symmetry and the plane of asymmetry are disposed along and extend at least approximately through an axis of the bead plate, such as is represented by longitudinal axis AX (FIGS. 3 and 4) of bead plate 106, for example.

It is to be understood that the planes of symmetry and asymmetry described above are generally established by the one or more valleys extending into and/or otherwise along the end member wall to the exclusion of any securement features that may be disposed on or along the end member wall (e.g., threaded studs 232 and threaded passages 234). That is, the establishment of plane of symmetry PSM and plane of asymmetry PAS is based on the position, orientation and/or configuration of the one or more valleys (e.g., valleys 212 and 214) as the same extend into end member wall 202 regardless of the position, arrangement, orientation and/or alignment of any of the one or more securement features that may be included on or along end member wall 202 to form bead plate 200. In the exemplary arrangement shown in FIGS. 8-10, however, one of threaded projections 232 is disposed in approximate alignment with plane of symmetry PSM and the other of threaded projections 232 is disposed to one side of plane of symmetry PSM with both of the threaded projections disposed on a common side of plane of asymmetry PAS. Additionally, threaded passages 234 are disposed on opposing sides of plane of symmetry PSM and on a common side of plane of asymmetry PAS. It will be appreciated, however, that other arrangements could alternately be used.

One advantage of using an end member configured in accordance with the subject matter of the present disclosure (e.g., bead plates 106, 106' and/or 200) is that additional bending stiffness and strength of the end member is attained, which is expected to provide improved performance in offset mounting arrangements. In some cases, it may be possible to eliminate the use of an external reinforcing bracket and/or plate that might normally be used to buttress the end member during use in offset mounting conditions. In other cases, it may be possible to utilize an external reinforcing bracket and/or plate of a less robust and, thus, reduced weight construction due to the increased strength and performance of such an end member. It is anticipated that other benefits and/or advantages associated with the use of an end member in accordance with the subject matter of the present disclosure may also be attained.

As used herein with reference to certain elements, components and/or structures, numerical ordinals (e.g., "first end" and "second end") merely denote different singles of a plurality and do not imply any order or sequence unless specifically defined by the claim language. Additionally, the terms "transverse," and the like, are to be broadly interpreted. As such, the terms "transverse," and the like, can include a wide range of relative angular orientations that include but are not limited to an approximately perpendicular angular orientation. Furthermore, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject matter of the present disclosure. Obviously, modifications and alterations will occur to others upon reading and understanding the preceding detailed description. Accordingly, it is to be distinctly understood that the foregoing descriptive matter is to be interpreted merely as illustrative and not as a limitation. As such, it is intended that the subject matter of the present disclosure be construed as including all such modifications and alterations insofar as they come within the scope of the appended claims and any equivalents thereof.

The invention claimed is:

1. An end member dimensioned for securement to an open end of an associated gas spring flexible wall, said end member comprising:
    an end member wall having an outer peripheral extent and formed from thin-walled metal material, said end member wall including:

a first wall portion disposed along said outer peripheral extent and including a substantially-flat surface area at least partially defining a first plane of said end member;
a second wall portion disposed radially outward of said first wall portion and at least partially defining said outer peripheral extent of said end member wall, said second wall portion extending from said first wall portion out of said first plane in a first direction; and,
a third wall portion disposed radially inward of at least part of said first wall portion, said third wall portion including a substantially-flat surface area and a plurality of valleys extending depthwise into said end member wall in said first direction and lengthwise across said substantially-flat surface area of said third wall portion separating said substantially-flat surface area of said third wall portion into at least first, second and third substantially-flat surface area sections, said substantially-flat surface area at least partially defining a second plane of said end member that is disposed in approximate alignment with said first plane and in spaced relation to said first plane in a second direction generally opposite said first direction, said substantially-flat surface area of said third wall portion including:
said first surface area section with a first section periphery including an outer periphery portion and first, second, third and fourth inner periphery portions, said first inner periphery portion extending linearly in a chordal direction across said end member from along said outer periphery portion, said second inner periphery portion disposed in offset-spaced relation to said first inner periphery portion and extending linearly in said chordal direction across said end member from along said outer periphery portion, said third inner periphery portion extending curvilinearly across said end member from along said first inner periphery portion, and said fourth inner periphery portion extending curvilinearly across said end member from along said second inner periphery portion;
said second surface area section with a second section periphery including an outer periphery portion, a first inner periphery portion and a second inner periphery portion, said first inner periphery portion of said second surface area section extending linearly in said chordal direction across said end member from along said outer periphery portion of said second surface area section; and,
said third surface area section with a third section periphery including an outer periphery portion, a first inner periphery portion and a second inner periphery portion, said first inner periphery portion of said third surface area section extending linearly in said chordal direction across said end member from along said outer periphery portion of said third surface area section;
said second and third surface area sections disposed in offset relation to one another with said first surface area section at least partially disposed therebetween such that said plurality of valleys includes a first valley formed into said end member wall between said first and second surface area sections and a second valley formed into said end member wall between said first and third surface area sections; and, a first securement feature disposed along said substantially-flat surface area of said third wall portion that is adapted to engage an associated external component.

2. An end member according to claim 1, wherein said first inner periphery portion of said first section periphery is oriented facing toward said first inner periphery portion of said second section periphery and said second inner periphery portion of said first section periphery is oriented facing toward said first inner periphery portion of said third section periphery.

3. An end member according to claim 1, wherein said third inner periphery portion of said first section periphery is oriented facing toward said second inner periphery portion of said second section periphery and said fourth inner periphery portion of said first section periphery is oriented facing toward said second inner periphery portion of said third section periphery.

4. An end member according to claim 1 further comprising a second securement feature with said first and second securement features disposed along a common one of said first, second and third substantially-flat surface area sections.

5. An end member according to claim 1, wherein said first securement feature is disposed along one of said first, second and third substantially-flat surface area sections and said end member includes a second securement feature disposed along a different one of said first, second and third substantially-flat surface area sections.

6. An end member according to claim 5, wherein said first and second securement features include one of a threaded passage extending into said end member wall in approximately said first direction and a threaded projection extending out from said end member wall in approximately said second direction.

7. An end member according to claim 1, wherein said second section periphery includes a third inner periphery portion operatively connected to said second inner periphery portion of said second section periphery opposite said first inner periphery portion of said second section periphery and said third section periphery includes a third inner periphery portion operatively connected to said second inner periphery portion of said third section periphery opposite said first inner periphery portion of said third section periphery with said third inner periphery portion of said second section periphery and said third inner periphery portion of said third section periphery facing inward toward one another.

8. An end member according to claim 7, wherein said first section periphery includes a fifth inner periphery portion operatively connected to said third inner periphery portion of said first section periphery opposite said first inner periphery portion of said first section periphery and a sixth inner periphery portion operatively connected to said fourth inner periphery portion of said first section periphery opposite said second inner periphery portion of said first section periphery with said fifth inner periphery portion oriented in facing relation to said third inner periphery portion of said second section periphery and with said sixth inner periphery portion oriented in facing relation to said third inner periphery portion of said third section periphery.

9. An end member according to claim 8, wherein said outer periphery portion of said first outer periphery of said first surface area section is a first outer periphery portion and said first outer periphery includes a second outer periphery portion extending between and operatively connecting said fifth and sixth inner periphery portions.

10. A gas spring assembly comprising:
a flexible wall extending circumferentially around a longitudinal axis and including a first open end; and, a first end member secured across said first open end such that a substantially fluid-tight seal is formed therewith and such that a spring chamber is at least partially defined by said first end member within said flexible wall, said first end member including an end member wall having an outer peripheral extent and formed from thin-walled metal material, said end member wall including:
  a first wall portion disposed along said outer peripheral extent and including a substantially-flat surface area at least partially defining a first plane of said second end member;
  a second wall portion disposed radially outward of said first wall portion and at least partially defining said outer peripheral extent of said end member wall, said second wall portion extending from said first wall portion out of said first plane in a first longitudinal direction; and,
  a third wall portion disposed radially inward of at least part of said first wall portion, said third wall portion including a substantially-flat surface area and a plurality of valleys extending into said end member wall, said substantially-flat surface area at least partially defining a second plane of said second end member that is disposed in approximate alignment with said first plane and in spaced relation to said first plane in a second longitudinal direction generally opposite said first direction, said substantially-flat surface area of said third wall portion including:
    a first surface area section with a first section periphery including an outer periphery portion and first, second, third and fourth inner periphery portions, said first inner periphery portion extending linearly in a chordal direction across said end member from along said outer periphery portion, said second inner periphery portion disposed in offset-spaced relation to said first inner periphery portion and extending linearly in said chordal direction across said end member from along said outer periphery portion, said third inner periphery portion extending curvilinearly across said end member from along said first inner periphery portion, and said fourth inner periphery portion extending curvilinearly across said end member from along said second inner periphery portion;
    a second surface area section with a second section periphery including an outer periphery portion, a first inner periphery portion and a second inner periphery portion, said first inner periphery portion of said second surface area section extending linearly in said chordal direction across said end member from along said outer periphery portion of said second surface area section; and,
    a third surface area section with a third section periphery including an outer periphery portion, a first inner periphery portion and a second inner periphery portion, said first inner periphery portion of said third surface area section extending linearly in said chordal direction across said end member from along said outer periphery portion of said third surface area section;
    said second and third surface area sections disposed in offset relation to one another with said first surface area section at least partially disposed therebetween such that said plurality of valleys includes a first valley formed into said end member wall between said first and second surface area sections and a second valley formed into said end member wall between said first and third surface area sections.

11. A gas spring assembly according to claim 10, wherein said substantially-flat surface area of said first wall portion is substantially continuous and extends in a circumferentially endless manner about said end member wall of said first end member.

12. A gas spring assembly according to claim 10, wherein at least one of said first, second and third surface area sections includes a securement feature disposed therealong that is dimensioned to engage an associated external component.

13. A gas spring assembly according to claim 12, wherein said securement feature is a first securement feature and said second end member includes a second securement feature with said first securement feature disposed along said second surface area section and said second surface feature disposed along said third surface area section.

14. A gas spring assembly according to claim 12, wherein said end member includes a threaded passage extending through said end member wall and into fluid communication with said spring chamber from along said first surface area section.

15. A gas spring assembly according to claim 10, wherein said end member wall of said first end member includes a first longitudinally-extending plane of symmetry across which at least said first, second and third section peripheries are symmetrical.

16. A gas spring assembly according to claim 15, wherein said end member wall includes a second longitudinally-extending plane of symmetry disposed transverse to said first plane of symmetry and across which at least said first, second and third section peripheries are symmetrical.

17. An end member dimensioned for securement to an associated open end of an associated gas spring flexible wall having an associated end surface, said end member comprising:
  an end member wall having an outer peripheral extent and formed from thin-walled metal material, said end member wall including:
    a first wall portion disposed along said outer peripheral extent and including a substantially-flat surface area at least partially defining a first plane of said end member and dimensioned to abuttingly engage the associated end surface of the associated gas spring flexible wall;
    a second wall portion disposed radially outward of said first wall portion and at least partially defining said outer peripheral extent of said end member wall, said second wall portion extending from said first wall portion out of said first plane in a first direction;
    a third wall portion disposed radially inward of said first wall portion, said third wall portion including a substantially-flat surface area, said third wall portion offset from said first wall portion in a second direction opposite said first direction such that said substantially-flat surface area at least partially defines a second plane of said end member that is offset from said first plane and oriented in approximate alignment with said first plane, said third wall portion including:
      a first surface area section with a first section periphery extending between and operatively connecting said first surface area section with said first wall portion, said first section periphery including an outer periphery portion and first, second, third and fourth inner periphery portions, said first inner periphery portion extending linearly in a chordal direction across said end member from along said outer periphery portion, said second inner periphery portion disposed in offset-spaced relation to said first inner periphery portion and extending linearly in said chordal direction across said end member from along said outer periphery portion, said third inner periphery portion extending across said end member from along said first inner periphery portion in a non-aligned relation to said first inner periphery portion, and said fourth inner periphery portion extending across said end member from along said second inner periphery portion in a non-aligned relation to said second inner periphery portion;

a second surface area section with a second section periphery extending between and operatively connecting said second surface area section and said first wall portion, said second section periphery including an outer periphery portion, a first inner periphery portion and a second inner periphery portion, said first inner periphery portion of said second surface area section extending linearly in said chordal direction across said end member from along said outer periphery portion of said second surface area section, said second inner periphery portion of said second surface area section extending from along said first inner periphery portion of said second surface area section in non-aligned relation to said first inner periphery portion of said second surface area section; and, a third surface area section with a third section periphery extending between and operatively connecting said third surface area section and said first wall portion, said third section periphery including an outer periphery portion, a first inner periphery portion and a second inner periphery portion, said first inner periphery portion of said third surface area section extending linearly in said chordal direction across said end member from along said outer periphery portion of said third surface area section, said second inner periphery portion of said third surface area section extending from along said first inner periphery portion of said third surface area section in non-aligned relation said first inner periphery portion of said third surface area section;

said second and third surface area sections disposed in offset relation to one another with said first surface area section at least partially disposed therebetween such that a first valley is formed into said end member wall between said first and second surface area sections and a second valley is formed into said end member wall between said first and third surface area sections.

18. An end member according to claim 17, wherein said second and third inner periphery portions of said first section periphery as well as said second inner periphery portions of said second and third peripheries are curvilinear such that said first and second valleys each include at least an approximately linear valley segment and a curvilinear valley segment.

19. An end member according to claim 17, wherein said second section periphery includes a third inner periphery portion operatively connected to said second inner periphery portion of said second section periphery opposite said first inner periphery portion of said second section periphery and said third section periphery includes a third inner periphery portion operatively connected to said second inner periphery portion of said third section periphery opposite said first inner periphery portion of said third section periphery with said third inner periphery portion of said second section periphery and said third inner periphery portion of said third section periphery facing inward toward one another.

20. An end member according to claim 19, wherein said first section periphery includes a fifth inner periphery portion operatively connected to said third inner periphery portion of said first section periphery opposite said first inner periphery portion of said first section periphery and a sixth inner periphery portion operatively connected to said fourth inner periphery portion of said first section periphery opposite said second inner periphery portion of said first section periphery with said fifth inner periphery portion oriented in facing relation to said third inner periphery portion of said second section periphery and with said sixth inner periphery portion oriented in facing relation to said third inner periphery portion of said third section periphery.

* * * * *